H. S. PIERCE.
MEANS FOR LUBRICATING BEARINGS.
APPLICATION FILED SEPT. 5, 1914.
1,138,408.
Patented May 4, 1915.
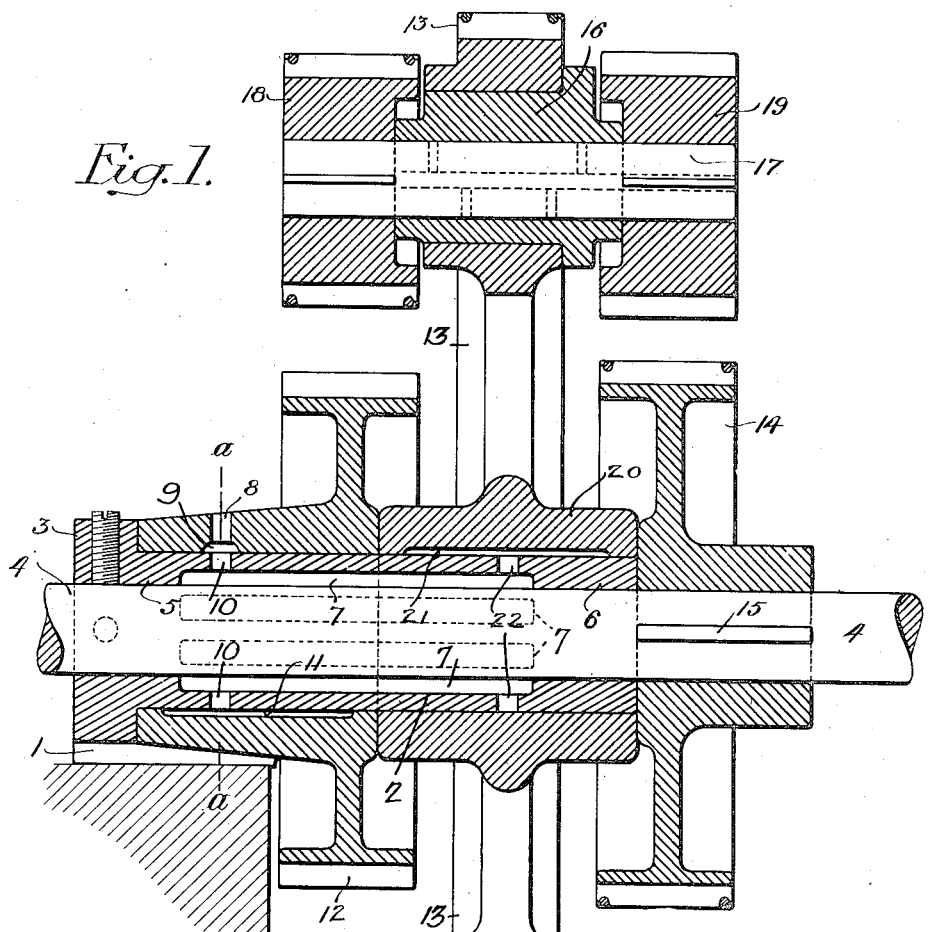
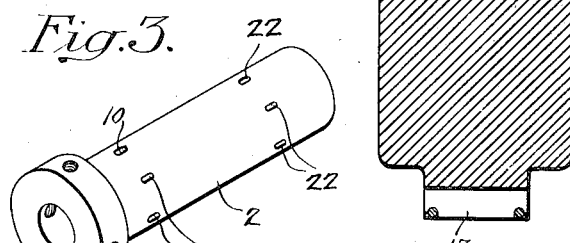
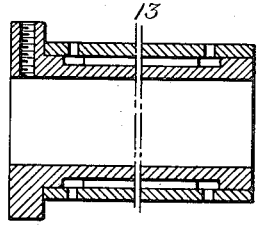
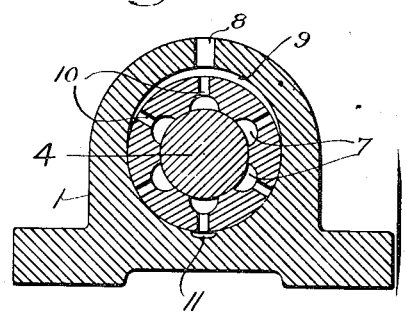
Inventor:
Harold S. Pierce,
by his Attorneys.
Howson & Howson

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

MEANS FOR LUBRICATING BEARINGS.

1,138,408.   Specification of Letters Patent.   Patented May 4, 1915.

Application filed September 5, 1914.   Serial No. 860,414.

*To all whom it may concern:*

Be it known that I, HAROLD S. PIERCE, a citizen of the United States, residing in Philadelphia, Pennsylvania, have invented certain Improvements in Means for Lubricating Bearings, of which the following is a specification.

My invention relates to certain improvements in means for lubricating bearings, particularly the bearings of sprocket wheels.

The object of my invention is to provide means for lubricating bearings, which must be kept constantly lubricated and which are inaccessible under ordinary conditions.

In the accompanying drawing: Figure 1, is a vertical sectional view through a link belt reduction gear, illustrating a series of sprocket wheels mounted on a shaft; Fig. 2, is a sectional view on the line *a—a*, Fig. 1; Fig. 3, is a detached perspective view of the sleeve containing the lubricating chamber; and Fig. 4, is a view of a modification of the invention.

Referring to the drawing, 1 is a fixed bearing, in the present instance secured to any suitable foundation, and mounted in this bearing is a sleeve 2, which extends considerably beyond the bearing and has a flange 3 forming a head. The flange of the sleeve has threaded openings to receive set screws, as shown, to secure the sleeve rigidly to the shaft 4, which extends therethrough. The sleeve has bearings 5 and 6 thereon and has a series of longitudinal channels 7 between these two points for the reception of the lubricant, and the bearing 1 has an opening 8 for the reception of a grease cup, or other means of supplying grease or other lubricant to the bearing. This bearing has an eccentric groove 9 therein which communicates with the opening, and in the sleeve is a series of radial passages 10 which communicate with the groove 9 and the several longitudinal channels 7 in the sleeve. In the bottom of the bearing 1 is a longitudinal groove 11, which also communicates with the passage 10 so that, when the sleeve is turning in the bearing, it will be thoroughly lubricated. Cast integral with the bearing, in the present instance, is a sprocket wheel 12 and mounted on the overhanging portion of the spindle 2 is a large sprocket wheel 13, while mounted on the shaft extending beyond the sleeve is a sprocket wheel 14. This wheel 14 is secured to the shaft 4 by a key 15, or other suitable means.

Mounted in the rim of the large sprocket wheel 13 is a bearing sleeve 16 which carries a shaft 17 on which are keyed sprocket wheels 18 and 19. The sprocket wheel 18 is in line with the fixed sprocket wheel 12 and the sprocket wheel 19 is in line with the sprocket wheel 14 on the shaft 4. In the hub 20 of the large sprocket wheel 13 is a groove 21 and communicating with this groove is a series of radial passages 22 leading from the longitudinal channels 7, so that grease, or other lubricant, admitted through the passage 8, will travel through the channel 7 and out through the passages 22, thoroughly lubricating the bearing between the sleeve 2 and the hub 20 of the large sprocket wheel 13. By this arrangement there is no necessity for lubricating openings in the hub of the main wheel which, owing to the proximity of the sprocket wheels 12 and 14, would be very difficult to reach in order to supply the lubricant when necessary; and the parts can be lubricated while in motion.

When ordinary grease cups are used, centrifugal force tends to force the lubricant from the bearings into the cups, but by my invention I utilize the centrifugal force to aid in lubricating the bearings.

I claim:—

1. The combination of a fixed bearing; a sleeve mounted in the fixed bearing and having a portion extending beyond the bearing, said sleeve having longitudinal channels and radiating passages extending from the channels to the periphery of the sleeve, one of said passages being at the bearing, the bearing having a lubricant opening communicating with said first mentioned passages; and a wheel loosely mounted on the sleeve and in line with the other radiating passages.

2. The combination of a fixed bearing having a fixed sprocket wheel thereon; a sleeve mounted in the bearing and extending beyond the end thereof; a shaft mounted in the sleeve and extending beyond the end of the sleeve, the sleeve having a series of longitudinal channels therein and two series of radiating passages communicating with the channels, the bearing having a lubricant opening communicating with one series of channels, the other series of channels being at a point beyond the bearing; a sprocket wheel loosely mounted on the projecting portion of the sleeve.

3. The combination of a fixed bearing having a lubricating opening therein; a sleeve mounted in the bearing and having a portion extending beyond the end thereof; a sprocket wheel mounted on the overhanging portion of the sleeve; a shaft extending through the bearing and the sleeve; a sprocket wheel on that portion of the bearing beyond the sleeve, the sleeve having a series of longitudinal channels therein surrounding the shaft, and two series of radial passages, one in line with the lubricating opening in the bearing, the other in line with the hub of the sprocket wheel mounted on said sleeve, said sprocket wheel having a channel, and the bearing having an eccentric passage forming communication between two or more of the radiating passages of the sleeve with the lubricating opening in the bearing.

In testimony whereof, I have signed my name to this specification, in the presence of two subscribing witnesses.

HAROLD S. PIERCE.

Witnesses:
   Jos. H. Klein,
   Wm. A. Barr.